(12) United States Patent
Bojilov et al.

(10) Patent No.: US 7,051,783 B1
(45) Date of Patent: May 30, 2006

(54) PRECISION MOLDING METHOD

(75) Inventors: Vesela Bojilov, Manilus, NY (US); Rolf Hubert, Pelham, NH (US); Henry Barney, Warwick, RI (US)

(73) Assignee: NDM Tooling Associates Inc., Cranston, RI (US)

( * ) Notice: Subject to any disclaimer, the term of this patent is extended or adjusted under 35 U.S.C. 154(b) by 0 days.

(21) Appl. No.: 11/045,252

(22) Filed: Jan. 31, 2005

(51) Int. Cl.
*B22D 19/00* (2006.01)

(52) U.S. Cl. ............................. 164/97; 164/6; 164/39; 164/98; 164/100

(58) Field of Classification Search ................ 164/97, 164/6, 39, 203, 522, 98, 100
See application file for complete search history.

(56) References Cited

U.S. PATENT DOCUMENTS

| | | | | |
|---|---|---|---|---|
| 4,431,449 A | * | 2/1984 | Dillon et al. | 75/246 |
| 5,851,686 A | | 12/1998 | Aghajanian et al. | 528/614 |
| 5,861,115 A | * | 1/1999 | Hayashi et al. | 264/28 |
| 6,224,816 B1 | * | 5/2001 | Hull et al. | 264/401 |
| 6,264,863 B1 | * | 7/2001 | Schwartz et al. | 264/109 |
| 6,399,018 B1 | | 6/2002 | German et al. | 419/2 |
| 6,502,623 B1 | | 1/2003 | Schmitt | 164/97 |
| 6,585,930 B1 | * | 7/2003 | Liu et al. | 419/7 |

* cited by examiner

*Primary Examiner*—Patrick Joseph Ryan
*Assistant Examiner*—Ing-Hour Lin
(74) *Attorney, Agent, or Firm*—Winston & Strawn LLP

(57) ABSTRACT

The invention relates to a method for forming a green article for subsequent sintering or infiltration. This method includes providing a mold having an internal cavity that outlines the shape of the article, introducing metal or ceramic particles into the mold in an amount sufficient to provide the article in a desired size, adding a solution comprising an organic fluxing agent onto the particles with the solution carrying the organic fluxing agent into interstices between the particles, and freezing the solution to form a solid green article. The invention also relates to an apparatus and method for manufacturing dimensionally stable articles. The method includes providing a mold having an internal cavity that outlines the shape of the article, introducing metal or ceramic particles into the mold in an amount sufficient to provide the article in a desired size, vibrating the mold to compact the particles therein, adding a solution comprising an organic fluxing agent onto the compacted particles with the solution carrying the organic fluxing agent into interstices between the particles, freezing the solution to form a solid green article, heating the green article to vaporize the solution and fluxing agent and form a dry article, infiltrating the dry article with a molten metal having a lower temperature than that of the particles, and recovering the infiltrated article for finishing as a final article.

20 Claims, 2 Drawing Sheets

PRECISION MOLDING METHOD

BACKGROUND

The invention relates to a new molding technique for rapid tooling that can be used to provide high precision, low shrinkage articles that require very little machining or other finishing. The invention specifically relates to a method of making such articles or products by forming a green article in a new way, and also to an apparatus and method for infiltrating the green article with a molten metal after removing moisture and binder from the green article.

The field of rapid tooling deals with methods to reduce the time required for producing a tooling component compared to traditional machining. Within this context, tooling or tools refer to mold cavities as well as machine elements used in manufacturing. Most injection molding, die-casting, stamping, and other industrial molding processes have high costs associated with tooling production.

A number of US patents seek to provide solutions to these disadvantages. U.S. Pat. No. 5,851,686 discloses the use of a gating means in combination with a spontaneous infiltration process to produce a metal matrix composite body. In particular, a permeable mass of filler material or a preform is spontaneously infiltrated by molten matrix metal to form the metal matrix composite body. A gating means is provided which controls or limits the areal contact between molten matrix metal and the filler material or perform in an attempt to result in less machining of a formed metal matrix composite body compared with a similar metal matrix composite body made without a gating means. The use of a gating means also allegedly ameliorates the tendency of a formed metal matrix composite body to warp due to the contact between the formed composite body and matrix metal carcass.

U.S. Pat. No. 6,224,816 discloses a tool having a molding surface formed from a flowable material (e.g., powder material) wherein the shape of molding surface is formed from a molding process using a master pattern having a surface with a shape substantially the same as the shape of the molding surface to be formed. The tool has at least one thermal control element located within it and spaced from the molding surface where a component used in forming the thermal control element is located within the flowable material prior to solidifying the material. The powder material is preferably a mixture of metals and the thermal control elements include fluid flow paths, heating elements, temperature sensors, and the like.

U.S. Pat. No. 6,399,018 discloses a multi-step forming, debinding, sintering and infiltrating process for making solid objects using a metal-ceramic composition. In this process, the mixture is held for a period of time to degas and settle the powdered material from a liquid binder. The packed geometry is then heated to above the melting temperature of the binder to remove the binder portion of the solid geometry. Upon removal of the binder the binder-free solid geometry is raised to a temperature where the metal pre-sinters together into a three-dimensional rigid matrix with interconnected porosity to form a solid precursor. The porous matrix includes the particulate ceramic material and a first metal, which are at least partially sintered. A molten second metal is then introduced to the fill the porous matrix and form an infiltrated matrix. In addition to speed of production, improvements associated with this method allegedly include a solid object having improved thermal conductivity, hardness, wear resistance and reduced shrinkage as compared with the rapid tooling techniques taught in the prior art.

U.S. Pat. No. 6,502,623 discloses a process for making a metal-matrix composite that includes a mixture of particulate ceramic powder with a liquid carrier, without addition of a binder, to prepare a slip having thixotropic properties. The slip is introduced in a substantially dense consistency into a casting mold which is then subjected to vibrations so as to separate the carrier from the ceramic particles and to allow the carrier to float upon the ceramic particles while at the same time compacting the slip to realize a ceramic preform of porous consistency having pores. After terminating the exposure of the casting mold to vibrations, the liquid carrier is removed and the preform is allowed to solidify in the casting mold, without exposure to any further compaction measures, such as sintering, pressing or the like, and the casting mold is maintained in a position of rest. Subsequently, matrix metal is poured into the casting mold to fill the pores of the preform.

As described in these patents, the field of rapid tooling has brought increased speed to producing prototype parts and molds, but further improvements are desirable and necessary in order to reduce the time and number of steps required to take a computer generated model to production tooling and then to actual part production. The present invention now provides such improvements.

SUMMARY OF THE INVENTION

The invention relates to a method for forming a green article for subsequent sintering or infiltration. This method comprises providing a mold having an internal cavity that outlines the shape of the article, introducing metal or ceramic particles into the mold in an amount sufficient to provide the article in a desired size, adding a solution comprising an organic fluxing agent onto the particles with the solution carrying the organic fluxing agent into interstices between the particles, and freezing the solution to form a solid green article.

Advantageously, the method further comprises compacting the particles during their introduction into the mold, heating the green article to vaporize the solution and burn out the fluxing agent and form a dry article having interstices, introducing a molten metal having a lower temperature than that of the particles into the article to infiltrate the interstices, and recovering the metal infiltrated article for finishing as a final article. The particles are compacted for best results, such as by vibrating the mold, and the article is infiltrated by providing the molten metal beneath the article so that the molten metal is introduced into the interstices by capillary action.

In one embodiment, the particles comprise iron, nickel, chromium, cobalt or an alloy of two or more of these and the molten metal comprises copper. In another embodiment, the particles comprise one or more ceramic materials and the molten metal comprises comprise iron, nickel, chromium, cobalt, copper or an alloy of two or more of these.

The invention also relates to a method for manufacturing dimensionally stable articles by: providing a mold having an internal cavity that outlines the shape of the article, introducing metal or ceramic particles into the mold in an amount sufficient to provide the article in a desired size, vibrating the mold to compact the particles therein, adding a solution comprising an organic fluxing agent onto the compacted particles with the solution carrying the organic fluxing agent into interstices between the particles, freezing the solution to form a solid green article, heating the green article to vaporize the solution and fluxing agent and form a dry article, infiltrating the dry article with a molten metal having a lower temperature than that of the particles, and recovering the infiltrated article for finishing as a final article.

Advantageously, the mold is vibrated as the particles are introduced therein with the vibration conducted in a manner to avoid displacing the particles out of the mold cavity, and the introduction of particles continues until the mold is filled. This is generally achieved by vibrating the mold in a horizontal rather than vertical direction.

The solution is preferably added dropwise until it begins to wet the exposed surface of the compacted particles, and then additional particles are added to the wet surface. The fluxing agent preferably comprises a sugar and the solution further comprises additives of one or more water-soluble organic compounds.

The green article is typically placed on a support as it is heated, with the heating conducted in stages including a first stage, typically at a temperature of about 50 to 80° C., for a time sufficient to vaporize the solution or to at least cause it to evaporate and thus provide the dry article, a second stage, typically at a temperature of about 400 to 600° C. for 30 minutes to 2 hours, to volatize the fluxing agent, and a third stage, typically at a temperature of about 800 to 1200° C. for 10 to 90 minutes, to infiltrate the dry article with the molten metal. Optionally, a uniform temperature rate increase is provided between the second to third stages. It is convenient to make the support in the form of a boat having a first chamber for supporting the article, a second chamber for holding the metal that is to be melted for infiltrating the article, and at least one channel for directing the molten metal beneath the article so that the article can be infiltrated by capillary action. The heating stages are preferably conducted under vacuum, optionally with an argon sweep gas that can assist in keeping the process free of contaminants and in keeping the oven clean from binder buildup. The molten metal is retained in the second chamber until a predetermined temperature near that of the third stage is attained to assure that the binder is substantially completely volatized before infiltrating the article with the molten metal.

The mold generally includes a release agent to facilitate removal of the frozen green article therefrom, and the mold is vibrated in a direction laterally to reduce loss of particles from the mold during compaction. Also, the infiltrated article, after cooling, exhibits less than 2% linear shrinkage, the recovery of the infiltrated article includes cooling the infiltrated article to room temperature and the finishing includes machining, cleaning or filling the final article to design specifications.

In a preferred embodiment, the mold is formed of rubber by preparing a master component in the size and shape of the final article compensated for anticipated shrinkage, encapsulating the master component with a curable rubber composition, curing the rubber composition to form a mold and demolding the master component from the mold to provide the internal cavity.

The invention also relates to a furnace boat for supporting and infiltrating green articles of metal or ceramic particles with molten metal by capillary action, which comprises a first chamber for supporting the article, a second chamber for holding the metal that is to be melted for infiltrating the article, and at least one channel for directing the molten metal beneath the article so that the article can be infiltrated by capillary action.

This boat is typically made of graphite and three channels are provided. It further comprises a sloped bottom wall in the first chamber to direct the molten metal into the channels and beneath the article. Preferably, the first and second chambers are divided by a gate which does not extend to the bottom wall of the boat, and a located beneath the gate wherein the metal shim melts at a temperature that is lower than that of the infiltrant, so that upon heating, the shim melts to form an opening beneath the gate that the metal infiltrant, after melting, can pass through and into the channels.

If desired, the boat can include a further second chamber so that the first chamber includes second chambers positioned adjacent the first chamber on opposite sides thereof.

BRIEF DESCRIPTION OF THE DRAWING FIGURES

DETAILED DESCRIPTION OF THE PREFERRED EMBODIMENTS

Figure 1:
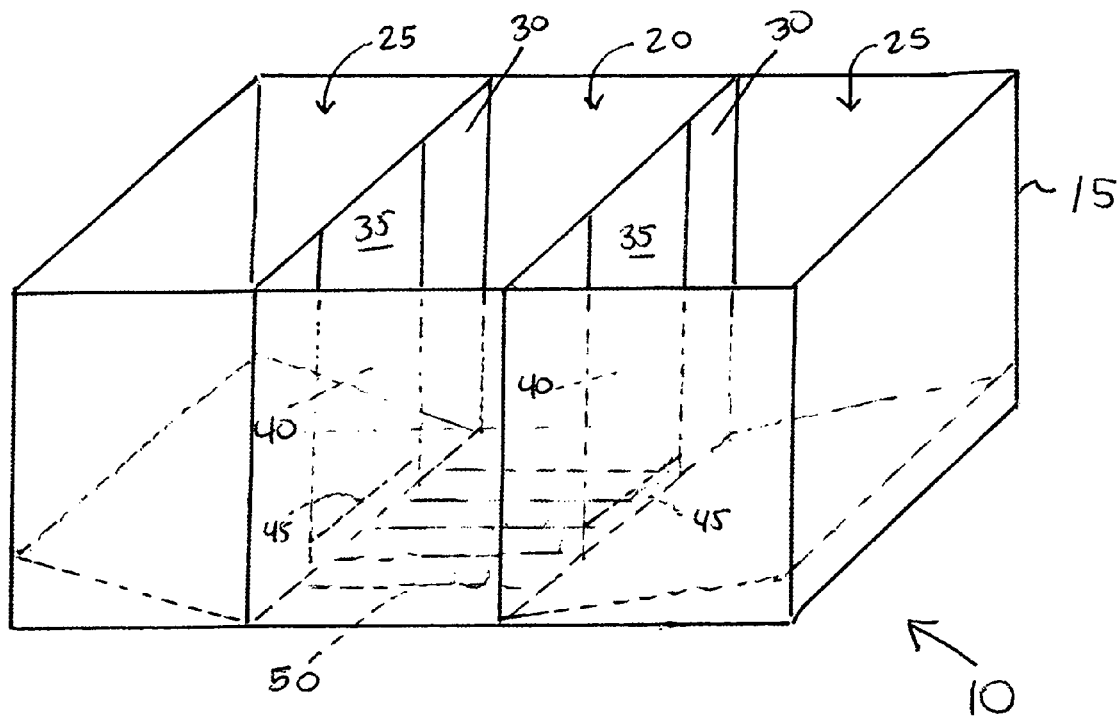
FIG. 1 is a perspective view of a furnace boat for carrying green articles into the furnace for infiltration.

As noted, the preferred method of the invention is for manufacturing dimensionally stable articles. In this method, a new technique is used for forming green articles for subsequent sintering or infiltration. This technique will be described in connection with rapid prototyping machines which make tooling articles for manufacturing multiple component parts, such as by injection molding of the parts upon a master injection tooling article. The technique disclosed herein results in a highly dimensionally stable article, namely one that exhibits a linear shrinkage of less than 2% and preferably 1.3 to 1.5% or even less. This amount is repeatably achieved so that the final design of the article can compensate for such shrinkage so that the dimensions of the final component parts are of the precisely desired or required values.

Initially, a model of the master injection tooling article is made of wax, clay or other materials that are easy to shape, conform and detail. The precise size and shape is made so that only a very small amount of cleanup is needed for the final article as well as for the injected parts that are made from the article. Routine tests can be conducted to determine the amount of linear shrinkage for any particular article, and then the final model can be made of a size and shape that compensates for the amount of shrinkage that is to be anticipated. The final component parts that are obtained from the master article are then obtained with the precise dimensions that are required. The routine testing can include estimating a linear shrinkage of 1.5% in the initial design, making parts using the process and then determining how close those parts are to the desired sizes. A new model can then be made compensating for any unexpected (greater or lesser) shrinkage. Generally, the amount of linear shrinkage is in the range of 1.3 to 1.5% so that a final model is achieved rather efficiently.

Next, the model is encapsulated with a flexible elastomer, such as silicone rubber, and cured to form a cavity that outlines the desired size and shape of the tooling article. While a number of different elastomers can be used, silicone rubber has been found to be preferred due to its relatively fast curing time and development of sufficiently high strength and flexibility. The particular rubber formulations and curing times are well known to skilled artisans so that no further details need be presented here. The rubber encapsulated model is allowed to cure at ambient temperature but it can be put under vacuum or under pressure if desired to remove any air bubbles therein. Any rubber mold material can be used but silicone rubber seems to provide the least amount of shrink and good pliability.

After curing, the model is removed from the mold. In accordance with good practices, the internal mold surface is treated with one or more conventional mold release agents to facilitate this operation. These agents are known in the art and generally match the material of mold. When a graphite mold is used, a graphite release agent is used, whereas when the model is made from ren board, the release agent is one that is made for ren material. Generally, the last agent to be applied is a graphite powder, and it is applied by a fine brush, spray or other suitable method. These mold release agents or compounds assist in the removal of the green article from the mold.

Next, the mold is filled with particles that are to be used as the desired material of the article. Generally, any one or a wide variety of ceramic, cermets or ceramic particles can be used. Specific examples of such particles are well known from U.S. Pat. Nos. 3,929,476, 4,073,999, 4,314,399, 4,327,156, 4,455,354, 4,491,558, and 5,507,336. These patents generally describe the use of powders including but not limited to tungsten carbide, steels, tool steels and stainless steels. While any of those particles can be used in this invention, particles of one or more ceramic materials or of metals comprising iron, nickel, chromium, cobalt or an alloy of two or more of these are most advantageous. For the preferred embodiment of this invention described herein, stainless steel particles having a size of 425 microns are used. Of course, other metal alloys or mesh sizes can be used depending upon the final article to be produced.

The particles are introduced into the mold in any one of a variety of ways, such as by pouring, shaking, sprinkling, dropping or spraying. It is possible to introduce the particles with the assist of pressure, but this must be done in a manner that does not distort the flexible rubber mold to avoid obtaining an article with a distorted shape. To assure proper compaction of the particles in the mold, the mold is placed upon a vibrating table. Depending upon the mold design and configuration, different types of vibrations can be applied to the mold. It has been found that vibrating the mold laterally as the particles are poured vertically downward into the mold results in optimum compaction of the particles. Lateral vibrations have been found to reduce loss of particles from the mold during compaction so that the particles are not dislocated or bounced out of the mold as much as they would be if the mold is vibrated fully or partially in a vertical direction. The lateral or horizontal vibration is preferably continued as the particles are introduced until the mold is completely filled with particles.

The next step in the process is to introduce the organic fluxing agent into the particles in the mold. The preferred fluxing agent is provided in a solution, and preferably in an aqueous solution, since a liquid can easily permeate the interstices between the particles to carry the fluxing agent therein. For optimum results the solution is added slowly, preferably in a drop-wise manner, until it begins to wet the exposed surface of the compacted particles. The visual observation of the solution on the surface of the particles assures that all interstices are filled with the solution and fluxing agent. If desired, any exposed surface solution can be removed or additional particles can be added to cover the exposed liquid.

Useful fluxing agents include organic materials that are soluble in an aqueous or organic solutions. The particular solution that is to be used needs to be one that can be vaporized or boiled away in the furnace prior to volatizing or thermally decomposing the fluxing agent. For ease of handling and cost considerations, an aqueous solution comprising water is used. The preferred fluxing agent is an organic compound that has at least some minimal some ability to adhere to the particles. A most preferred fluxing agent comprises a water soluble carbohydrate, such as sugar. Suitable sugars include mono- and/or disaccharide sugars such as maltose, lactose, galactose, sucrose, glucose, fructose, invert sugars and mixtures thereof. The concentration of the fluxing agent in the solution ranges from about 15 to 40% by volume.

Generally, additives of one or more water soluble organic compounds may be included in the solution to enhance its performance. Two preferred additives are alcohols and water-soluble polymers. While any aliphatic or aromatic alcohol can be used, a preferred alcohol is polyethylene glycol in an amount of about 0.02 to 2% and preferably about 0.5 to 1.25% by weight of the solution. A number of water soluble polymers can be used since these act to enhance binding properties after moisture is removed after the frozen stage. The most preferred water soluble polymer is polyvinyl pyrrolidone and is present in an amount of about 0.02 to 2% and preferably about 0.5 to 1.25% by weight of the solution. These additives help maintain the sugar in the solution, assist the solution in permeating the particles, help fill the interstices between the particles, and also enhance binding properties and acts as a lubricant or release to allow the infiltrates to totally surround the particles. The most preferred organic fluxing solution is a proprietary product known as B+D ACCUBIND™ that is commercially available from B+D Sales, Cranston, R.I.

After the organic fluxing agent is introduced into the particles in the mold, the combination is treated to immobilize the particles to form a green article that can be removed fro the mold. As the fluxing agent is introduced in a solution, the preferred way of immobilizing the particles is to subject the solution to environmental conditions that causes the solution to solidify. To achieve this the mold and its contents can be subjected to a temperature that is below that of the freezing point of the solution for a time sufficient to freeze or solidify the solution. First, any excess particles and solution are removed from the top of the mold so that a smooth top surface is provided. When an aqueous solution is used, the mold and its contents can then be placed in a freezer at a temperature that is below 0° C. (32° F.) for a time sufficient to freeze the solution. Although the exact conditions depend upon the size of the mold and its contents, typical temperature ranges include −10 to −20° C. (14 to −4° F.). The freezing time also will vary depending upon the size of the mold but will generally be between 2 and 7 hours and preferably is between about 3 and 4 hours.

The green article is then removed from the mold for further processing. Generally, different heat treatments are applied to the green article to prepare and infiltrate it with the molten metal. Prior to infiltration, the green article is treated by heating to dry and remove the solution, followed by heating at a higher temperature to vaporize and remove the fluxing agent. Thereafter the heating of the green article is increased to a predetermined temperature so that it can be infiltrated with molten metal.

In order to easily handle the green article, a support is prepared for carrying and transporting it though the heating steps. In addition, a boat, basket or similar type device may be used to introduce the metal powder of the infiltrant and the green part and support for transport into and out of an oven, furnace or other heating device.

Figure 2:
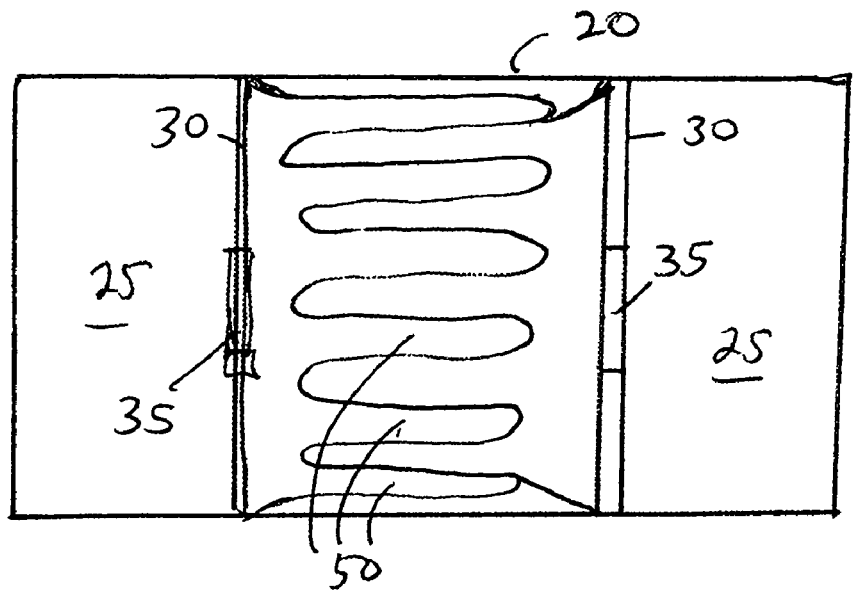
FIG. 2 is a top view of the furnace boat of FIG. 1.

A preferred boat is illustrated is illustrated in FIG. 1. This boat 10 is in the form of a rectangular box 15 having a plurality of compartments. For the specific boat that is illustrated, a central compartment 20 is located between two side compartments 25. Each outer compartment is configured to hold sufficient amounts of metal powder than can be melted to form the molten infiltrant. The side compartments 25 can be used to provide sufficient molten metal infiltrants for multiple green parts, or can be used to hold two different metal compositions for providing slightly different metal infiltrants for different parts. Of course, if desired, only one side compartment can be used for infiltrating a single green article placed therein. In addition, each side compartment 25 includes an inner wall 30 that includes an assembly 35 that selectively allows the molten metal infiltrant to enter into the central compartment 20 where it can contact the support and green article for infiltration thereof. The bottom of the central compartment includes a plurality of grooves 50 that receive the molten metal infiltrant, direct it to beneath the support and green article, and retain it there. FIG. 2 is a top view of the boat to illustrate the compartments 20, 25 and grooves 50.

Figure 3:
FIG. 3 is a cross-sectional side view taken from inside the furnace boat of FIG. 1.

As best shown in FIG. 3, the side compartments 25 each contain a supply of metal powder 55 that is eventually made molten upon heating in the furnace to form the infiltrant. As the metal becomes molten, it flows into the grooves 50 of the central compartment 20. To further encourage the molten metal to flow into the central compartment 20, each side compartment 25 preferably contains a slanted, angled or otherwise non-flat floor 60. This avoids dead spots of molten metal, such as in the corners of the boat 10.

Figure 4:
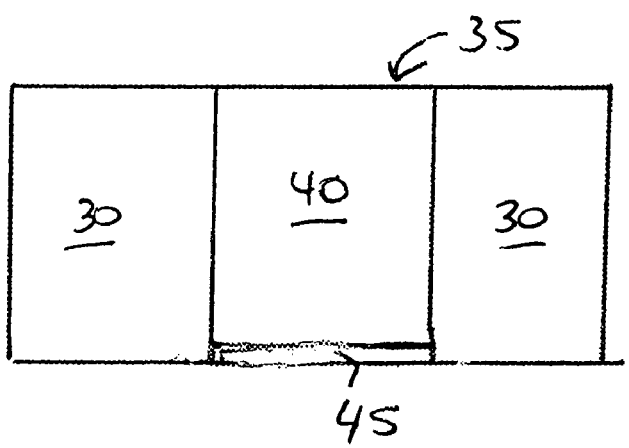
FIG. 4 is a view of an interior wall and gate of the furnace boat of FIG. 1.

As shown in FIG. 4, assembly 35 is configured to retain the metal powder in compartment 25 until it becomes molten. A number of different designs can be used to achieve this. In its simplest configuration, each assembly 35 includes a gate 40 which maintains the metal powder in the compartment. Gate 40 does not extend to the bottom or floor of the boat and instead a small area is provided for flow of molten metal therethrough. When the metal is in a powder state, a shim 45 is provided to fill the open small area and retain the metal powder in the compartment 25. The shim is made of a metal or alloy that melts at a temperature that is a few hundred degrees lower than that of the metal powder infiltrant 55 so that the shim melts and flows away to open the small area for flow of the molten metal infiltrant therethrough and into the center compartment. For example, when the metal infiltrant is copper or a copper alloy, the shim 45 can be made of a brass alloy that melts at a lower temperature than the copper or copper alloy. It is also possible to use a gate that can be opened by a mechanical or automatic mechanism to allow the molten metal to flow into the grooves 50 at the appropriate time.

Figure 5:
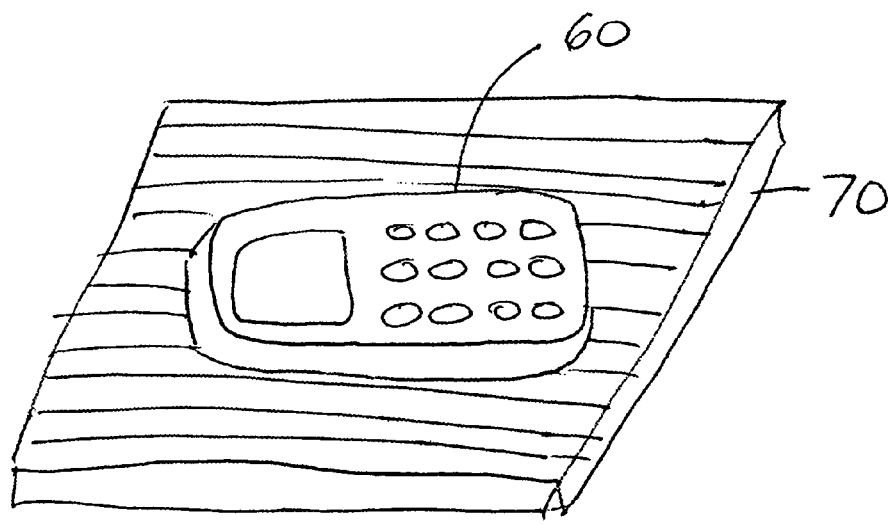
FIG. 5 is a perspective view of a perforated heavy gauge steel screen support for a green article to enable placement of the article in the furnace boat for transport into the furnace for infiltration.

After demolding the green article 60, it is placed on the support 70 as shown in FIG. 5. The support is typically a piece of perforated heavy gauge steel screen having bent sides. The support 70 may be made of any metal grid that is resistant to the temperatures of the furnace into which the green article is to be infiltrated, with the grid also being resistant to the molten metal that is used to infiltrate the particles of the green article. The grid must have sufficient open space or porosity to allow the molten metal to pass through the grid to contact the green article that is placed thereon. The green article and the grid are then placed into the boat 10 for introduction into the furnace for the steps of drying, fluxing agent vaporization and metal infiltration.

As shown in FIG. 5, a green article 60 in the form of a mold for injection molding of plastic telephone housings thereon is placed upon the metal grid support 70. The grid is placed upon the grooves 50 of the boat 10 as shown in FIG. 3 and then is placed into a vacuum furnace. The vacuum conditions are such that any removed moisture or vaporized fluxing agent can be removed from the furnaces so that these cannot interfere with the infiltration process. A particularly preferred furnace is one that can be programmed to carry out the desired heating temperatures and times.

When the preferred aqueous solution is used, the boat and article are initially heated at a temperature of above 50° C. (100° F.) and preferably is at around 60 to 70° C. (140 to 158° F.) and more preferably about 64° C. (150° F.) for 1 to 4 days to assure that all water and moisture is removed from the green article. The optimum heating suitable temperatures and times can be tailored to the specific solutions that are used to assure complete evaporation and removal of moisture and complete drying of the green article. This heating can be carried out in the same vacuum furnace used to infiltrate the article or it can be conducted in another furnace or convection oven since the temperatures needed to dry the article are relatively modest and can be achieved by any one of a wide variety of ovens or other heating devices.

After the green article is completely dry, it is ready to be sintered and infiltrated in the next steps. For the preferred organic fluxing agents, the vacuum furnace is programmed to heat the dried green article to around 400° C. to 600° C. for 30 minutes to 2 hours, and preferably for 1 hour at 500° C. This causes complete burning out and vaporization of the organic components so that all that remains are the particles in the form of the article. Next the temperature of the furnace is gradually increased to a higher temperature which is sufficient to melt the infiltrant. The temperature is preferably raised at a rate of about 20 to 30 degrees per hour, and preferably 25 degrees per hour, until the final temperature is reached to melt the infiltrant.

The infiltrant can be any one of a number of metal and its selection depends upon the material of the particles. In particular, the infiltrant comprises a material with a significantly lower melting temperature than that of the particles, so that the infiltrant can be melted while the particles remain intact. In addition, the infiltrant must have sufficient fluidity when molten so that it can permeate and infiltrate the particles and fill the interstices therein. The later property is important since it is highly desirable for substantially all interstices to be filled with the infiltrant so that the final article has optimum dimensional stability. As examples of suitable infiltrants, when ceramic particles are used, the infiltrant comprises iron, nickel, chromium, cobalt, copper or an alloy of two or more of these. Ceramic particles have a relative high melting temperature so that the use of higher meting metals or alloys can be tolerated. When the particles of the green article comprise iron, nickel, chromium, cobalt, or an alloy of two or more of these, the infiltrant comprises copper or an alloy of copper since the latter materials have a lower melting temperature than that of the metal particles. A skilled artisan can select the optimum formulation of the infiltrant for any particular particles by routine testing.

When a copper alloy is used as the infiltrant, a preferred copper alloy is a bronze alloy containing copper and between about 15 to 20% tin. That alloy requires a furnace temperature of about 800° C. to 1200° C. for a period of about 10 to 90 minutes, and preferably around 1050° C. for 30 minutes, to render it molten for infiltration of the green article. The boat must be made of a material that can withstand the temperatures of the furnace and that can retain the molten metal therein. One suitable material is graphite, although ceramics or other high temperature resistant inorganic materials can be used. As noted above, the molten infiltrant flows into the grooves 50 of the boat 10 and beneath the metal grid support and green article. As those parts are heated to the high temperature, the molten metal infiltrates the grid and part by capillary action and it flows upwardly through the grid and green article until all interstices of the article are filled. As noted above, the heating temperatures and times are sufficient for the article to be completely infiltrated with the molten bronze alloy. Next, the furnace heating is discontinued and the part is cooled to room temperature for recovery.

After the part is cooled, it is removed from the furnace and then machined cleaned and fitted to the final dimensions in a conventional manner. As noted above, the process provides a final article of high dimensional stability a low linear expansion or contraction so that these operations are minimized.

In alternative embodiments of the invention, the molten metal infiltrant can be introduced automatically by moving the support and green article over a supply of the molten infiltrant. While this complicates the process, it is included as an intended variation of the invention using known and existing technology. Other steps in the process can be handled automatically, such as by a robot or robotic device with appropriate computer control, to carry out steps such as the mixing and application of the elastomeric material to make the mold, the vibration of the mold while introducing the particles therein, and the automatic transporting of the mold, the support, or the boat into and out of heating devices without human intervention. These additional features add expense to the process but the technology for such additional features are available for use by skilled artisans if so desired.

What is claimed is:

1. A method for forming a green article for subsequent sintering or infiltration, which comprises:
   providing a mold having an internal cavity that outlines the shape of the article,
   introducing metal or ceramic particles into the mold in an amount sufficient to provide the article in a desired size,
   adding an aqueous solution comprising an organic fluxing agent onto the particles with the solution carrying the organic fluxing agent into interstices between the particles, and
   freezing the solution by cooling to a temperature that is below 0° C. (32° F.) for a time sufficient to freeze the solution to form a solid green article.

2. The method of claim 1 which further comprises compacting the particles during their introduction into the mold, heating the green article to vaporize the solution and burn out the fluxing agent and form a dry article having interstices, introducing a molten metal having a lower temperature than that of the particles into the article to infiltrate the interstices, and recovering the metal infiltrated article for finishing as a final article.

3. The method of claim 1 wherein the particles are compacted by vibrating the mold and the article is infiltrated by providing the molten metal beneath the article so that the molten metal is introduced into the interstices by capillary action.

4. The method of claim 1, wherein the particles comprise iron, nickel, chromium, cobalt or an alloy of two or more of these and the molten metal comprises copper, or the particles comprise one or more ceramic materials and the molten metal comprises comprise iron, nickel, chromium, cobalt, copper or an alloy of two or more of these.

5. The method of claim 1, wherein dry metal or ceramic particles are introduced into the mold, and the fluxing agent comprises a sugar and the solution further comprises additives of one or more water soluble organic compounds.

6. The method of claim 5, wherein the water soluble organic compounds include polyethylene glycol in an amount of about 0.02 to 2% by weight of the solution and polyvinyl pyrrolidone in an amount of about 0.02 to 2% by weight of the solution.

7. A method for manufacturing dimensionally stable articles which comprises:
   providing a mold having an internal cavity that outlines the shape of the article,
   introducing metal or ceramic particles into the mold in an amount sufficient to provide the article in a desired size,
   vibrating the mold to compact the particles therein,
   adding an aqueous solution comprising an organic fluxing agent onto the compacted particles with the solution carrying the organic fluxing agent into interstices between the particles,
   freezing the solution by cooling to a temperature that is below 0° C. (32° F.) for a time sufficient to freeze the solution to form a solid green article,
   heating the green article to vaporize the solution and fluxing agent and form a dry article,
   infiltrating the dry article with a molten metal having a lower temperature than that of the particles, and
   recovering the infiltrated article for finishing as a final article.

8. The method of claim 7, wherein the fluxing agent comprises a sugar and the solution further comprises additives of one or more water soluble organic compounds.

9. The method of claim 8, wherein dry metal or ceramic particles are introduced into the mold and the water soluble organic compounds include polyethylene glycol in an amount of about 0.02 to 2% by weight of the solution and polyvinyl pyrrolidone in an amount of about 0.02 to 2% by weight of the solution.

10. The method of claim 7, wherein the mold is vibrated as the particles are introduced therein with the vibration conducted in a manner to avoid displacing the particles out of the mold cavity, and the introduction of particles continues until the mold is filled.

11. The method of claim 7, wherein the solution is added dropwise until it begins to wet the exposed surface of the compacted particles, and then additional particles are added to the wet surface.

12. The method of claim 7, wherein the mold includes a release agent to facilitate removal of the frozen green article therefrom, and the mold is vibrated in a direction laterally to reduce loss of particles from the mold during compaction.

13. The method of claim 7, wherein the infiltrated article, after cooling, exhibits less than 2% linear shrinkage, the recovery of the infiltrated article includes cooling the infiltrated article to room temperature and the finishing includes machining, cleaning or filling the final article to design specifications.

14. The method of claim 7, wherein the mold is formed of rubber by preparing a master component in the size and shape of the final article compensated for anticipated shrinkage, encapsulating the master component with a curable rubber composition, curing the rubber composition to form a mold and demolding the master component from the mold to provide the internal cavity.

15. The method of claim 7, wherein the green article is placed on a support as it is heated, with the heating conducted in stages including a first stage at a temperature of about 50 to 80° C. for a time sufficient to remove the solution and provide the dry article, a second stage at a temperature of about 400 to 600° C. for 30 minutes to 2 hours to volatize the fluxing agent, and a third stage at a temperature of about 800 to 1200° C. for 10 to 90 minutes to infiltrate the dry article with the molten metal, optionally with a uniform temperature rate increase between the second to third stages.

16. The method of claim 15, wherein the support is a graphite boat having a first chamber for supporting the article, a second chamber for holding the metal that is to be melted for infiltrating the article, and at least one channel for directing the molten metal beneath the article so that the article can be infiltrated by capillary action.

17. The method of claim 16, wherein the heating stages are conducted under vacuum, optionally using an argon sweep gas, and the molten metal is retained in the second chamber until a predetermined temperature near that of the third stage is attained to assure that the binder is substantially completely volatized before infiltrating the article with the molten metal.

18. The method of claim 16, wherein the boat includes three channels and a sloped bottom wall in the first chamber to direct the molten metal into the channels and beneath the article.

19. The method of claim 18, wherein the first and second chambers of the boat are divided by a gate which does not extend to the bottom wall of the boat, and a metal shim located beneath the gate wherein the metal shim melts at a temperature that is lower than that of the infiltrant metal, so that upon heating, the shim melts to form an opening beneath the gate that the metal infiltrant, after melting can pass through and into the channels.

20. The method of claim 16, wherein the boat further comprises a further second chamber so that the first chamber includes second chambers positioned adjacent the first chamber on opposite sides thereof.

* * * * *